(12) United States Patent
Kim et al.

(10) Patent No.: US 9,855,902 B2
(45) Date of Patent: Jan. 2, 2018

(54) MULTI-LAYERED NOISE ABSORBING AND INSULATING MATERIAL HAVING AIR-PERMEABILITY

(71) Applicants: HYUNDAI MOTOR COMPANY, Seoul (KR); IKSUNG Co., LTD., Chungbuk (KR)

(72) Inventors: Min Su Kim, Ulsan (KR); Jae Chan Lim, Ulsan (KR); Ki Wook Yang, Cheongju-si (KR); Kue Seok Kang, Cheongju-si (KR); Bong Jik Lee, Seongnam-si (KR)

(73) Assignees: HYUNDAI MOTOR COMPANY, Seoul (KR); IKSUNG CO., LTD., Chungbuk (KR)

( * ) Notice: Subject to any disclaimer, the term of this patent is extended or adjusted under 35 U.S.C. 154(b) by 71 days.

(21) Appl. No.: 14/835,604

(22) Filed: Aug. 25, 2015

(65) Prior Publication Data
US 2016/0059799 A1 Mar. 3, 2016

(30) Foreign Application Priority Data
Sep. 2, 2014 (KR) ........................ 10-2014-0116045

(51) Int. Cl.
*B60R 13/08* (2006.01)
*B32B 7/12* (2006.01)
(Continued)

(52) U.S. Cl.
CPC .......... *B60R 13/0861* (2013.01); *B32B 5/022* (2013.01); *B32B 5/06* (2013.01); *B32B 5/16* (2013.01); *B32B 7/12* (2013.01); *B32B 27/12* (2013.01); *B32B 27/14* (2013.01); *B32B 27/302* (2013.01); *B32B 27/32* (2013.01); *B32B 27/34* (2013.01); *B32B 27/36* (2013.01); *B32B 27/40* (2013.01); *B32B 37/12* (2013.01); *B32B 37/153* (2013.01); *G10K 11/168* (2013.01);
(Continued)

(58) Field of Classification Search
CPC .................................................. B60R 13/0861
USPC ................................ 296/39.3; 280/847, 770
See application file for complete search history.

(56) References Cited

U.S. PATENT DOCUMENTS 7,448,468 B2 * 11/2008 Czerny ............... B60R 13/0861
181/210
7,677,358 B2 * 3/2010 Tocchi ................ B60R 13/0861
181/204

(Continued)

FOREIGN PATENT DOCUMENTS

JP 2008-087695 A 4/2008
JP 2011-143763 A 7/2011
(Continued)

*Primary Examiner* — Jason S Morrow
(74) *Attorney, Agent, or Firm* — McDermott Will & Emery LLP

(57) ABSTRACT

A multi-layered noise absorbing and insulating material includes a noise insulation material having opposing first and second major surfaces. The noise insulation material includes an adhesive resin including an air permeability-forming material. A first noise absorption material is adhered to the first major surface of the noise insulation material. A second noise absorption material is adhered to the second major surface of the noise insulation material. The multi-layered noise insulation absorbing and insulating material has air-permeability.

17 Claims, 6 Drawing Sheets

(51) Int. Cl.
  *B32B 27/36* (2006.01)
  *B32B 27/40* (2006.01)
  *B32B 27/32* (2006.01)
  *B32B 27/30* (2006.01)
  *B32B 37/12* (2006.01)
  *B32B 5/02* (2006.01)
  *B32B 5/06* (2006.01)
  *B32B 5/16* (2006.01)
  *B32B 27/12* (2006.01)
  *B32B 27/14* (2006.01)
  *B32B 27/34* (2006.01)
  *G10K 11/168* (2006.01)
  *B32B 37/15* (2006.01)

(52) U.S. Cl.
  CPC . *B32B 2262/0276* (2013.01); *B32B 2262/062* (2013.01); *B32B 2262/08* (2013.01); *B32B 2264/0285* (2013.01); *B32B 2264/067* (2013.01); *B32B 2264/10* (2013.01); *B32B 2264/102* (2013.01); *B32B 2264/104* (2013.01); *B32B 2274/00* (2013.01); *B32B 2307/102* (2013.01); *B32B 2307/718* (2013.01); *B32B 2307/724* (2013.01); *B32B 2605/00* (2013.01)

(56) References Cited

U.S. PATENT DOCUMENTS

| | | | | |
|---|---|---|---|---|
| 8,695,757 B2 * | 4/2014 | Duval | ............ | B32B 5/22 181/286 |
| 2003/0062738 A1 * | 4/2003 | Fujii | ............ | B29C 43/006 296/39.3 |
| 2006/0214474 A1 * | 9/2006 | Omiya | ............ | B60R 13/0861 296/198 |
| 2010/0066121 A1 * | 3/2010 | Gross | ............ | G10K 11/162 296/146.5 |
| 2011/0293892 A1 * | 12/2011 | Ogawa | ............ | B32B 5/26 428/172 |
| 2015/0166119 A1 * | 6/2015 | Kim | ............ | B32B 38/0012 156/221 |

FOREIGN PATENT DOCUMENTS

| | | |
|---|---|---|
| KR | 10-2005-0088823 A | 9/2005 |
| KR | 10-2006-0097228 A | 9/2006 |
| KR | 10-0768824 B1 | 10/2007 |
| KR | 10-1181201 B1 | 9/2012 |

\* cited by examiner

MULTI-LAYERED NOISE ABSORBING AND INSULATING MATERIAL HAVING AIR-PERMEABILITY

CROSS-REFERENCE TO RELATED APPLICATION

This application claims under 35 U.S.C. §119(a) the benefit of Korean Patent Application No. 10-2014-0116045 filed on Sep. 2, 2014, the entire contents of which are incorporated herein by reference.

TECHNICAL FIELD

The present inventive concept relates to a multi-layered noise absorbing and insulating material having air-permeability.

BACKGROUND

Noise absorption and insulation materials have been installed in the interior of a vehicle, so as to block engine noise, remove dust and absorb noise, and to prevent transmission of low frequency and high frequency complex energy generated during driving to the interior space of the vehicle.

However, in the case of such conventional noise absorption and insulation materials for a vehicle, a separate noise insulation material is adhered to a surface material layer and a noise absorption material constituting the noise absorption and insulation material by using an adhesive, or direct coating, and the like. Accordingly, there are problems of decrease of vehicle fuel efficiency due to an increase in the overall weight of the noise absorption and insulation material, as well as decrease of productivity due to the complicated production process of the noise absorption and insulation material.

On the other hand, polyester, which is often used as a noise absorption material for improving noise absorption performance, has weak organization due to the structural characteristic of having noise absorption performance and the like, and therefore there are problems in which wear-resistance is weak, it is easily damaged by flooding, brittle resistance at low temperature is weak, its surface layer is easily contaminated and damaged, and its appearance becomes poor.

No particular suggestions for solving these problems have been found in the prior art. However, in regard to techniques about general noise absorption and insulation materials, Korean Patent Publication No. 1181201 discloses a method for manufacturing a wheel guard for vehicle, which comprises: a first felt layer forming step of forming a felt layer by carding polyester fiber and needle punching thereof; and a second felt layer forming step of forming a felt layer by carding polyester fiber and needle punching thereof, but it is not considered to be excellent in constitution of noise absorption and insulation material, and in noise insulation performance.

Further, Japanese Patent Laid-Open Publication No. 2011-143763 discloses an automobile exterior material comprising a thermoplastic resin layer on one side of a non-woven fabric layer, in which a molten thermoplastic resin sheet extruded from an extrusion molding machine is formed by pressing a laminate laminated on one side of the non-woven fabric in the thickness direction, but the constitution of the noise absorption and insulation material and the noise absorption performance are not excellent.

Further, Korean Patent Publication No. 768824 discloses equipment for production of a functional multilayer extruded sheet, in which a non-woven fabric or textile supplements made of natural and plastic fibers, as a material of part for a vehicle such as vehicle trunk part, wheel guard, door trim and rack, is formed as multi-layer inside or outside of the extruded sheet, but in view of the constitution of the noise absorption and insulation material used, air-permeability is not achieved.

In addition, Japanese Patent Laid-Open Publication No. 2008-087695 discloses an automotive sound insulation/water-proofing type mud guard, in which a water-proofing membrane is formed by impregnating a foamed acrylic based/SBR based resin of 50 $g/m^2$ to 500 $g/m^2$ on a back side of a non-woven fabric layer having impact absorbing and noise absorbing functions, but it can't have air-permeability in view of constitution of the noise absorption and insulation material, and it is not considered to be excellent in noise absorption performance and noise insulation performance.

Accordingly, fundamental efforts to solve interior noise problem by reducing noise generated from dynamic machines such as vehicles, and at the same time, to reduce weight and production cost and the like are needed.

The above information disclosed in this Background section is only for enhancement of understanding of the background of the inventive concept and therefore it may contain information that does not form the prior art that is already known in this country to a person of ordinary skill in the art.

SUMMARY

Accordingly, the present inventive concept is objected to provide a multi-layered noise absorbing and insulating material, which can promote reduction of process numbers and production costs as well as optimization of noise absorption and insulation performance and weight reduction at the same time.

Further, another object of the present inventive concept is to provide a multi-layered noise absorbing and insulating material, which can block air-borne noise, thereby relieving interior noise.

The present inventive concept has been made in an effort to solve the above-described problems associated with prior art.

In one aspect, the present inventive concept provides a multi-layered noise absorbing and insulating material including a noise insulation material having opposing first and second major surfaces. The noise insulation material includes an adhesive resin including an air permeability-forming material. A first noise absorption material is adhered to the first major surface of the noise insulation material. A second noise absorption material is adhered to the second major surface of the noise insulation material. The multi-layered noise absorbing and insulating material has air-permeability. In certain embodiments, the multi-layered noise absorbing and insulating material is integrated.

In an embodiment, the air permeability-forming material may be at least one selected from the group consisting of thermoplastic elastomer (TPE), inorganic powder, natural fiber and natural wood flour.

In certain embodiments, the thermoplastic elastomer may be at least one selected from the group consisting of polystyrene-based, polyolefin-based, polyester-based, polyurethane-based and polyamide-based elastomer.

In certain embodiments, the inorganic powder may be at least one selected from the group consisting of calcium carbonate, barium sulfate, silicon dioxide, aluminum oxide, magnesium hydroxide and vermiculite.

In certain embodiments, the natural fiber may be Chinese yam, jute or a mixture thereof.

In certain embodiments, the natural wood flour may be at least one selected from the group consisting of pine tree, bamboo and oak tree.

In certain embodiments, the air permeability-forming material may be contained in an amount of 40 to 70 wt %, based on the total weight of the adhesive resin.

In certain embodiments, the adhesive resin may be at least one of thermoplastic resin and thermosetting resin.

In certain embodiments, the thermoplastic resin may be at least one selected from the group consisting of polyethylene, polypropylene (PP), polyethyleneterephthalate (PET), polybutyleneterephthalate (PBT), polytrimethyleneterephthalate (PTT), nylon, polyacetal resin, vinyl chloride resin, polystyrene, acrylonitrile-butadiene-styrene (ABS) resin and acryl resin.

In certain embodiments, the thermosetting resin may be at least one resin selected from the group consisting of phenol resin, urea resin, melamine resin, epoxy resin and polyester resin.

In certain embodiments, the noise absorption material may be any one selected from the group consisting of needle-punched material, silk wadding PET felt wherein low melting fiber and polyester fiber (pet fiber) are thermally bonded, other felt and non-woven fabric.

In certain embodiments, the thickness of the noise insulation material may be 0.01 to 10 mm.

In certain embodiments, the multi-layered noise absorbing and insulating material may have an entire thickness of 1 to 100 mm, air-permeability in the thickness direction of 0.01 to 300 (cm$^3$/cm$^2$·sec), and weight of 10 to 3000 g/cm$^2$.

In another aspect, the present inventive concept provides a vehicle comprising a part containing a multi-layered noise absorbing and insulating material.

In an embodiment, the part for a vehicle may be a wheel guard.

A method of manufacturing a multi-layered noise absorbing and insulating material includes supplying a first noise absorption material to a first roller, supplying a second noise absorption material to a second roller, supplying a noise insulation material between the first and second rollers, and binding the first noise absorption material and the second noise absorption material to the noise insulation material by a post-tensioning force between the first roller and the second roller. The noise insulation material may have an adhesive resin disposed thereon.

In certain embodiments, in the step of supplying the noise insulation material between the first and second rollers, the noise insulation material may be extruded through a T-die.

Other aspects and preferred embodiments of the inventive concept are discussed infra.

The above and other features of the inventive concept are discussed infra.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept, and wherein.

Figure 1:
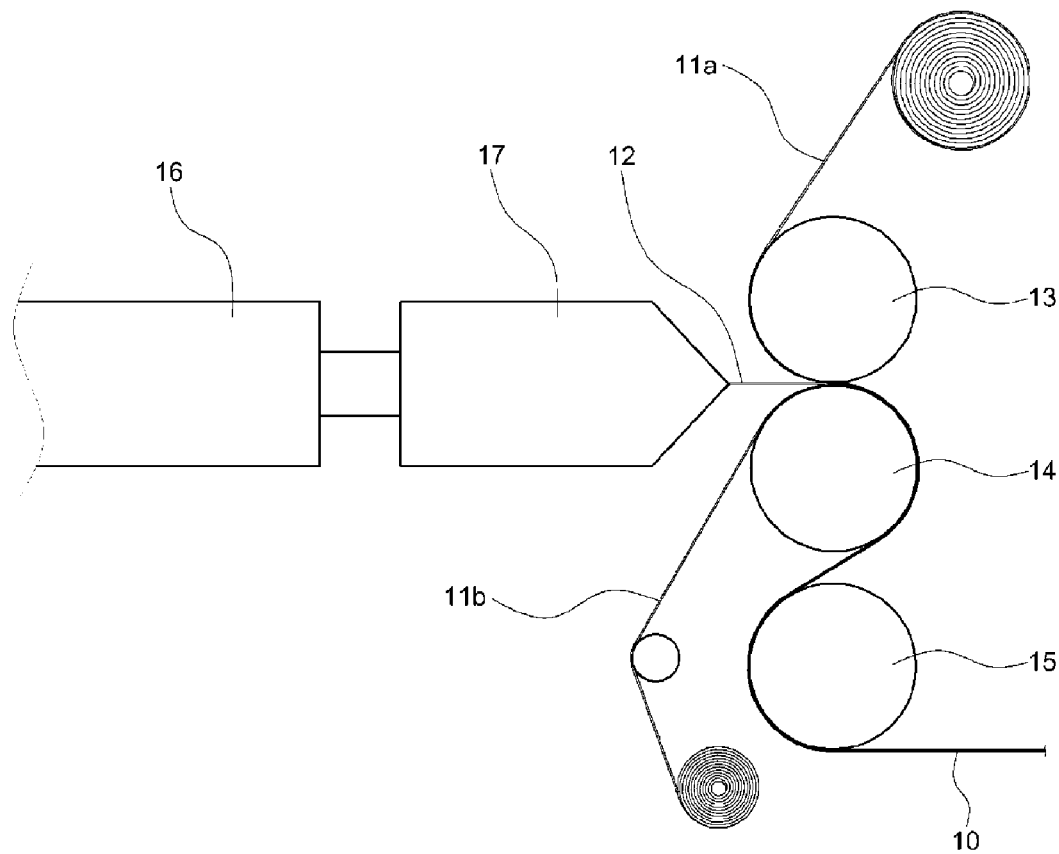
FIG. 1 is a schematic diagram showing a method for manufacturing the multi-layered noise absorbing and insulating material according to the present inventive concept.

It should be understood that the appended drawings are not necessarily to scale, presenting a somewhat simplified representation of various preferred features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

Hereinafter, the present inventive concept will be described in detail in one embodiment.

The multi-layered noise absorbing and insulating material of the present inventive concept has multi-layer structure wherein a noise absorption material is adhered to the top and bottom of a noise insulation material including an adhesive resin comprising an air permeability-forming material, and then integrated, wherein the noise insulation material has air-permeability.

In certain embodiments, the air permeability-forming material may be at least one selected from the group consisting of thermoplastic elastomer (TPE), inorganic powder, natural fiber and natural wood flour.

In certain embodiments, the thermoplastic elastomer may be at least one selected from the group consisting of polystyrene-based, polyolefin-based, polyester-based, polyurethane-based and polyamide-based elastomer.

In certain embodiments, the inorganic powder may be at least one selected from the group consisting of calcium carbonate, barium sulfate, silicon dioxide, aluminum oxide, magnesium hydroxide and vermiculite.

In certain embodiments, as the natural fiber, vegetable fiber, animal fiber or mineral fiber may be used. In certain embodiments the natural fiber may be at least one selected from the group consisting of Chinese yam, cotton, flax, jute, silk, glass fiber and asbestos. In certain embodiments, the natural fiber may be Chinese yam, jute or a mixture thereof.

In certain embodiments, short natural fiber in length of about 10 to 100 mm may be used.

In certain embodiments, the natural wood flour may be at least one selected from the group consisting of pine tree, bamboo and oak tree.

In certain embodiments, the air permeability-forming material may have particle size of 1 to 1,000 μm. In certain embodiments, the air permeability-forming material may be contained in an amount of 40 to 70 wt %, based on the total weight of the adhesive resin.

In certain embodiments, the adhesive resin comprising the air permeability-forming material may have a shape in which the adhesive resin is covering the noise insulation material through physical bonding with the air permeability-forming material. After compressing the noise insulation material, which is bonded to the noise absorption materials, the compressed resin is restored, thereby securing air-permeability through pore-formed structure, and through this, noise absorption-noise insulation-noise absorption structure having air-permeability can be completed, thereby improving NVH performance.

In certain embodiments, the adhesive resin may be thermoplastic resin, thermosetting resin or a mixture thereof.

The thermoplastic resin may be at least one selected from the group consisting of polyethylene, polypropylene (PP), polyethyleneterephthalate (PET), polybutyleneterephthalate (PBT), polytrimethyleneterephthalate (PTT), nylon, polyacetal resin, vinyl chloride resin, polystyrene, acrylonitrile-butadiene-styrene (ABS) resin and acryl resin. The thermosetting resin may be at least one resin selected from the group consisting of phenol resin, urea resin, melamine resin, epoxy resin and polyester resin.

In certain embodiments, the thermoplastic resin is a resin whose shape can be deformed by heating again after molded by heating, and has an advantage that it can be efficiently processed by extrusion molding and injection molding. It may be weak on thermal resistance and solvent resistance, compared to a thermosetting resin. The thermoplastic resin may be made of a polymer material, which is plastically deformed to become fluid by heating and reversibly hardened when cooled again.

According to the present inventive concept, the noise absorption material may be any one selected from the group consisting of needle-punched material, silk wadding PET felt wherein low melting fiber and polyester fiber (PET fiber) are thermally bonded, other felt, and non-woven fabric. The needle punched material is characterized by a known mechanical fiber integration method, which integrates the upper and lower fiber layers by vertically punching, with a plurality of needles. The fiber layers may be laminated with at least one synthetic fiber selected from the group consisting of polyethylene terephthalate, polyester, polyethylene, polypropylene, copolyester and polyamide. In certain embodiments, at least one of the above fiber materials and the low melting fiber may be mixed to be use.

Further, the silk wadding PET felt is marked by the characteristic that it is more bulky than the needle punched material based on the same weight because laminated fiber layers, which consists of at least one synthetic fiber selected from the group consisting of polyethylene terephthalate, polyester, polyethylene, polypropylene, copolyester and polyamide, and the low melting fiber, are heated using an oven to be thermally bonded for integration.

In addition, the non-woven fabric refers to fabric made by adhering or tangling fibers by mechanical manipulation or thermal bonding, or by using chemical reagents. For example, non-woven fiber, which may include natural fiber made of cotton, Chinese yam or wool fiber. In certain embodiments, the non-woven fiber may additionally or alternatively include at least one synthetic fiber selected from the group consisting of polyethylene terephthalate, polyester, polyethylene, polypropylene, copolyester and polyamide.

According to the present inventive concept, the noise insulation material may have the thickness of 0.01 to 10 mm. If the thickness of the noise insulation material is thinner than 0.01 mm, the noise insulation performance and the lamination strength with the noise absorption material layer may be weak, and if the thickness is thicker than 10 mm, there may be problems in which air-permeability can't be secured, handling on the product molding process may be difficult, moldability and productivity may be deteriorated, vehicle assembling property may be deteriorated due to high strength, and vehicle fuel efficiency may be reduced due to heavy weight.

According to an embodiment of the present inventive concept, the multi-layered noise absorbing and insulating material may have the entire thickness of 1 to 100 mm and weight of 10 to 3000 g/cm$^2$.

On the other hand, a method for manufacturing the multi-layered noise absorbing and insulating material according to the present inventive concept will be described with reference to FIG. 1 illustrated the accompanying drawings.

A sheet of the first noise absorption material 11a is supplied to a first roller 13, a sheet of the second noise absorption material 11b is supplied to a second roller 14, and a noise insulation material 12 containing adhesive resin is supplied between the first and the second rollers through T-die 17 of an extruder 16.

Thus, the sheets of the first noise absorption material 11a and the second noise absorption material 11b are bound to the noise insulation material 12 by the binding post-tensioning force of the first and the second rollers. The resulting multi-layered noise absorbing and insulating material 10 is supplied to a cooling roller 15. Thereby the multi-layered noise absorbing and insulating material 10 according to the present inventive concept can be manufactured.

At this time, air-permeability, i.e., gas-permeability of the multi-layered noise absorbing and insulating material 10 may be decided depending on the binding post-tensioning force of the first and the second rollers. Preferably, air-permeability of the multi-layered noise absorbing and insulating material 10 according to the present inventive concept in the thickness direction may be 0.01 to 300 (cm$^3$/cm$^2$·sec) through thickness direction. More preferably, air-permeability may be 0.1 to 30 (cm$^3$/cm$^2$·sec).

Figure 2:
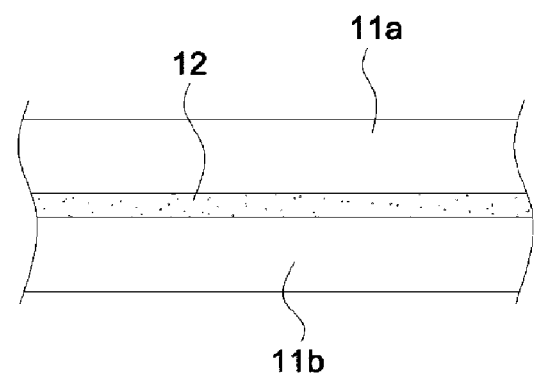
FIG. 2 is a schematic diagram of the cross-section of the multi-layered noise absorbing and insulating material according to the present inventive concept.

FIG. 2 is a schematic diagram of the cross-section of the multi-layered noise absorbing and insulating material according to the present inventive concept.

In certain embodiments, the multi-layered noise absorbing and insulating material may be included in a part for a vehicle.

Figure 7:
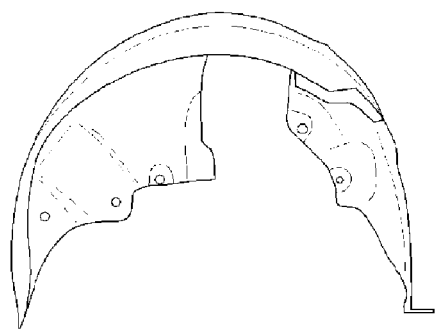
FIG. 7 is a picture showing the side of the wheel guard for a vehicle according to the present inventive concept.
Figure 8:
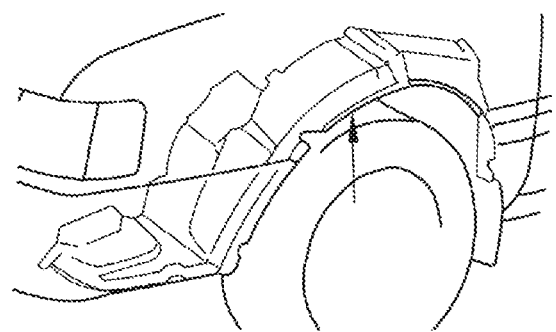
FIG. 8 illustrates the location of the wheel guard within the vehicle.

According to certain embodiments of the present inventive concept, the part for a vehicle may be a wheel guard. FIG. 7 is a picture showing the side of the wheel guard for a vehicle according to the present inventive concept. FIG. 8 shows the location of the wheel guard mounted on the vehicle. The wheel guard may be installed between a tire of the vehicle and the vehicle body to reduce travel/road noise during driving. The multi-layered noise absorbing and insulating material included in the wheel guard is configured to reduce noise during driving of the vehicle. In addition, the wheel guard may protect the vehicle body from being rusted or from other damages caused due to mud or water.

The multi-layered noise absorbing and insulating material of the present inventive concept having excellent noise absorption and insulation performance can improve interior noise by blocking air-borne noise such as tire emission sound, and improve human feeling sensitivity by reducing the high frequency sensitive to human sensitivity. Further, working environment can be improved because dust is not generated by air-permeability structure of the multi-layered noise absorbing and insulating material, and N.V.H. (Noise, Vibration, Harshness) can be improved.

EXAMPLES

While this inventive concept will be described in connection with what is presently considered to be practical exemplary embodiments, it is to be understood that the inventive concept is not limited thereto.

Experimental Example

PET FELT (400 g/m$^2$, 3~4 mm) as the first noise absorption material and the second noise absorption material, and polyolefin elastomer (POE) (400 g/m$^2$, 0.26 mm) as a noise insulation material were prepared. Then, a noise absorbing and insulating material of 8~10 mm thickness was manufactured in the form that the noise insulation material was laminated between the first and the second noise absorption materials.

Comparative Example 1

A mono-layered noise absorption material, which was made of a noise absorption material, PET (1,200 g/m$^2$, 8~10 mm), was manufactured (LM fiber: R/F ratio=40:60).

Comparative Example 2

A conventional low-price tri-layered noise absorbing and insulating material, wherein a noise absorption material, PET (30 g/m$^2$) layer and a noise insulation material, PP/EPDM (1,000 g/m$^2$) layer were sequentially laminated, was manufactured.

Comparative Example 3

A mono-layered noise absorption material manufactured by European Competitor, which was made of a noise absorption material, PET (1,200 g/m$^2$, 8~10 mm), was used (LM fiber: R/F ratio=35:65).

Test 1

In order to find out noise absorption performance of the noise absorbing and insulating materials according to above Experimental Example and Comparative Examples 1 to 3, noise absorption coefficient of the noise absorbing and insulating material s according to Experimental Example and Comparative Examples 1 to 3 was tested by common Alpha Cabin Measurement: Absorption, and the results were shown in the following Table 1 and FIG. 3. The noise absorption index and noise insulation index of the following Table 1 represent arithmetic mean values in the frequency range of 500~6500 Hz.

TABLE 1

| Classification | Experimental Example | Comparative Example 1 | Comparative Example 2 | Comparative Example 3 |
| --- | --- | --- | --- | --- |
| Noise Absorption Index (Noise Absorption Coefficient %) | 0.283 | 0.216 | 0.113 | 0.184 |
| Noise Insulation Index (dB) | 19.097 | 5.418 | 19.439 | 4.395 |

Figure 3:
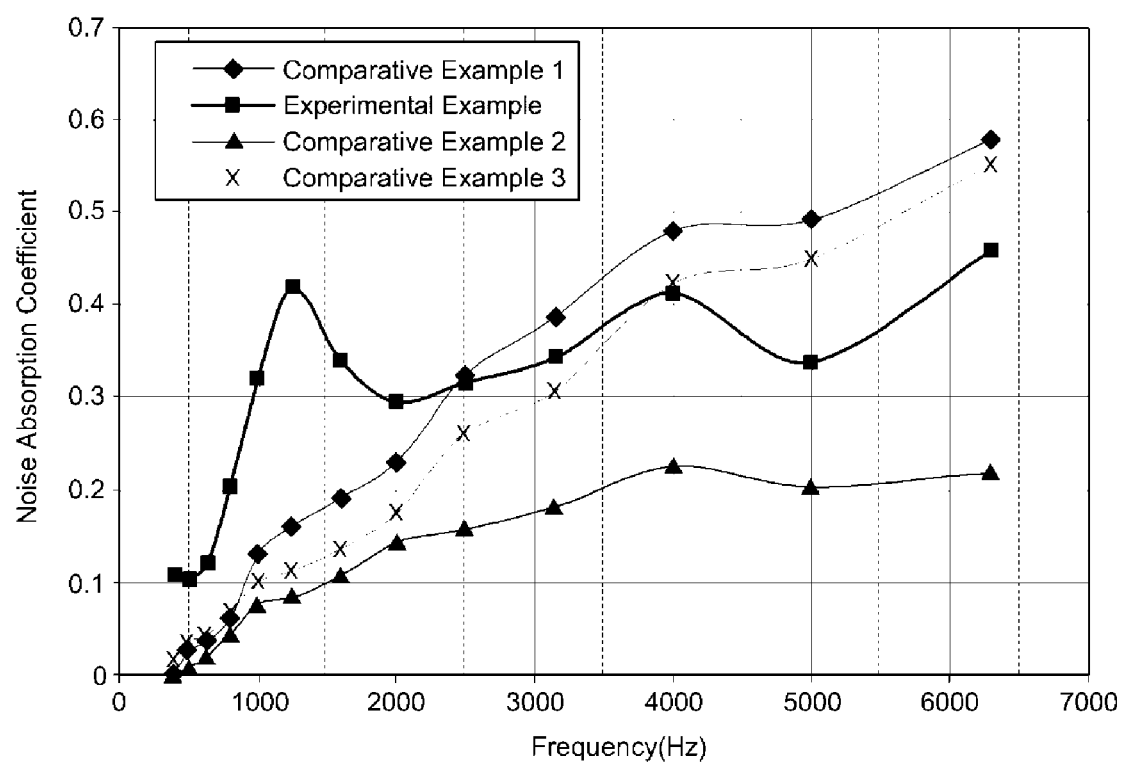
FIG. 3 is a graph showing the result of testing noise absorption of the multi-layered noise absorbing and insulating material according to the present inventive concept.

According to the results from the above Table 1 and the accompanying FIG. 3, it could be found that when frequency is 4 kHz or less, the noise absorption efficiency of the noise absorbing and insulating material according to the Experimental Example of the present inventive concept, i.e., noise absorption performance, is more excellent than Comparative Examples.

Test 2

In order to find out noise insulation performance of the noise absorbing and insulating material according to the Experimental Example and Comparative Examples 1 to 3, transmission loss rate was tested by common small cabin method [APA MAT TEST: STL (Sound trans loss)]. The results were shown in the above Table 1 and FIG. 4.

Figure 4:
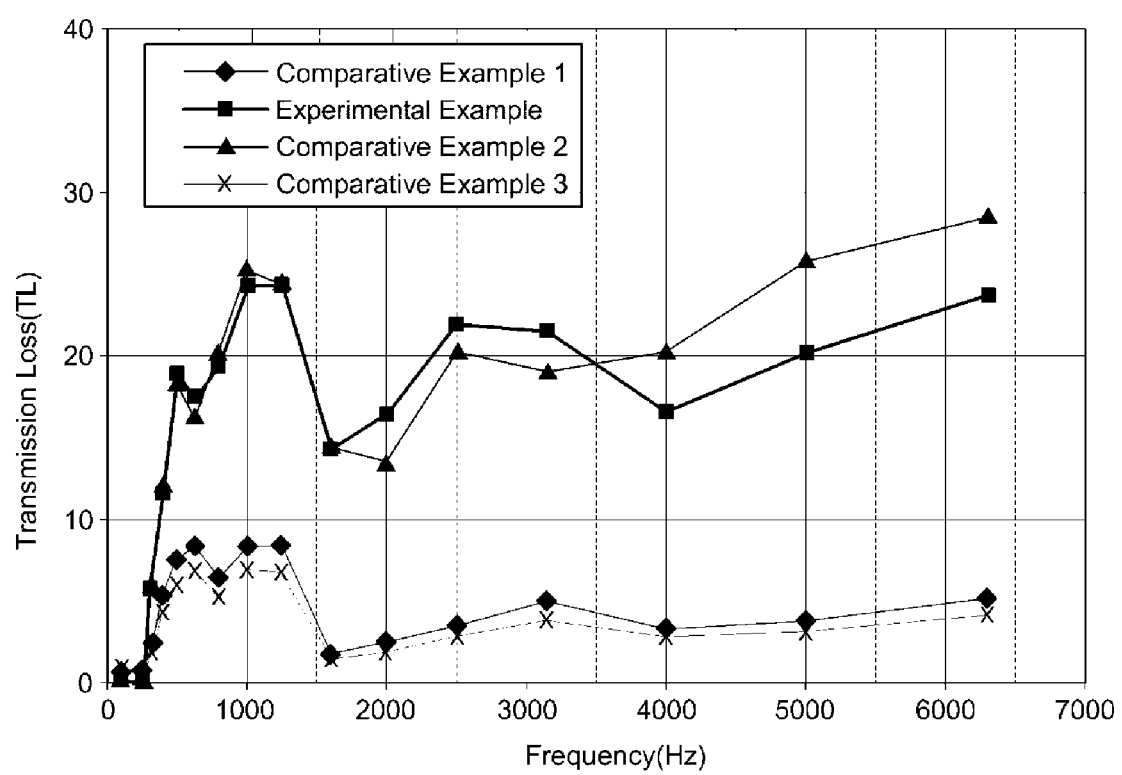
FIG. 4 is a graph showing the result of testing noise insulation of the multi-layered noise absorbing and insulating material according to the present inventive concept.

According to the results of the above Table 1 and the accompanying FIG. 4, it could be found that when frequency is 4 kHz or less, the transmission loss rate of the noise absorbing and insulating material according to the Experimental Example of the present inventive concept, i.e., noise insulation performance, is more excellent than Comparative Examples, even though there are variations depending on frequency.

Test 3

In order to find out interior noise performance at a rear seat during steady speed driving of the noise absorbing and insulating material s according to the Experimental Example and Comparative Examples 1 to 3, rear seat interior noise rate was tested by a frequency analyzer, a noise vibration measuring device. The results were shown in the following Table 2. In the following Table 2, OA refers to the total noise level expressed by the sum of DBs in all frequency bands, and its unit is DB; and AI refers to communication recognition level or noise recognition level expressed by analyzing 500~2,000 Hz frequency band, and its unit is %. Herein, 0~20 kHz refers to the test result in the entire frequency bands including the result in the frequency band of 0~0.5 kHz, which generally affected by vibration. On the contrary, 0.5~20 kHz refers to the test result excluding the result in the frequency band of 0~0.5 kHz, which affected by vibration.

TABLE 2

| Classification | 80 KPH Steady Speed Driving | | | 100 KPH Steady Speed Driving | | |
|---|---|---|---|---|---|---|
| | 0~20 kHz | | 0.5~20 kHz | 0~20 kHz | | 0.5~20 kHz |
| | OA(%) | AI(%) | OA(%) | OA(%) | AI(%) | OA(%) |
| Experimental Example | 65.0 | 83.3 | 57.8 | 67.5 | 72.9 | 61.0 |
| Comparative Example 1 | 64.9 | 82.6 | 57.8 | 67.9 | 70.6 | 61.7 |
| Comparative Example 2 | 65.5 | 79.7 | 59.3 | 68.7 | 67.8 | 62.9 |
| Comparative Example 3 | 65.1 | 83.1 | 58.0 | 68.5 | 69.2 | 62.1 |

As shown in the above Table 2, according to the results of 80 KPH steady speed driving and 100 KPH steady speed driving of the noise absorbing and insulating material according to the Experimental Example of the present inventive concept, it could be found that in the middle and high frequency of 0.5 kHz or higher, the Experimental Example shows lower interior noise rate than Comparative Examples. Thus, it could be found that this is effective to rear seat air flow noise introduced into interior.

Test 4

Noise absorption performance of the noise absorbing and insulating material according to Experimental Example of the present inventive concept depending on difference of air-permeability was tested, and the results were shown in the following Table 3 and accompanying FIG. 5. At this time, it was tested against high air-permeability [7~12 ($cm^3/cm^2 \cdot sec$)] and low air-permeability [6~10 ($cm^3/cm^2 \cdot sec$)] of the noise absorbing and insulating material, separately.

TABLE 3

| Classification | Frequency (Hz) | | | | | | | | | |
|---|---|---|---|---|---|---|---|---|---|---|
| | 400 | 500 | 630 | 800 | 3.15k | 4k | 5k | 6.3k | 8k | 10k |
| Absorption Coefficient for Experimental Example (Air-Permeability 6~10 $cm^3cm^2 \cdot sec$) | 0.29 | 0.29 | 0.30 | 0.28 | 0.37 | 0.53 | 0.48 | 0.97 | 0.84 | 1.14 |
| Absorption Coefficient for Experimental Example (Air-Permeability 7~12 $cm^3cm^2 \cdot sec$) | 0.33 | 0.34 | 0.35 | 0.52 | 0.44 | 0.53 | 0.42 | 0.76 | 0.72 | 0.61 |

Figure 5:
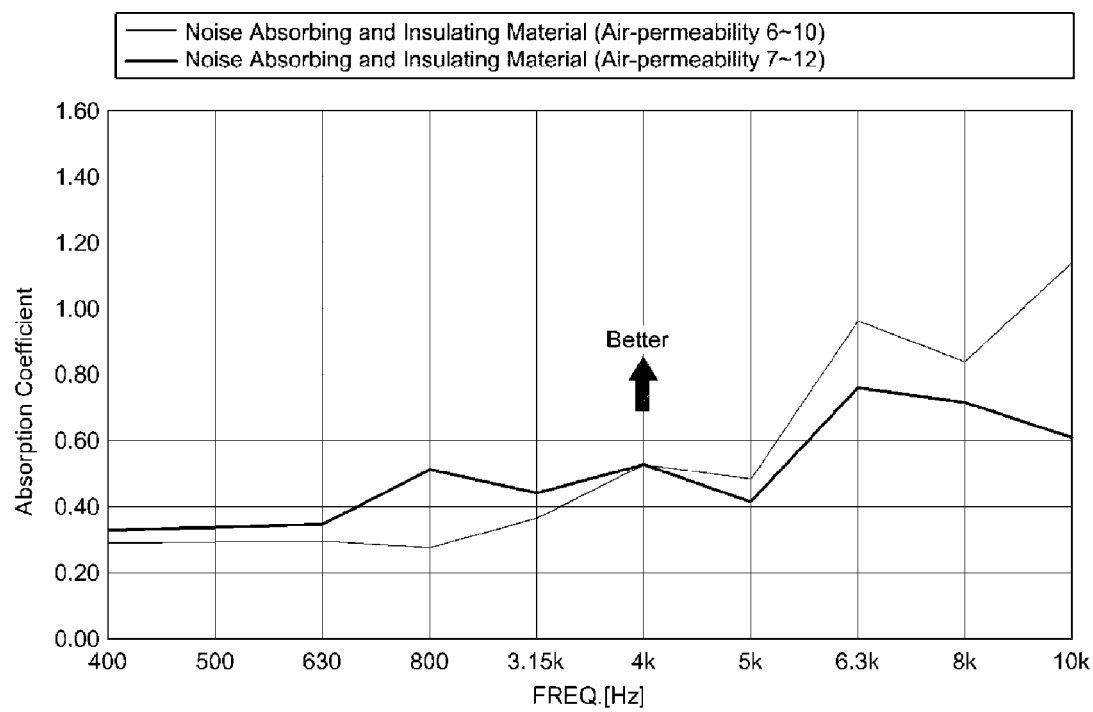
FIG. 5 is a graph showing the result of testing noise absorption of the multi-layered noise absorbing and insulating material according to the present inventive concept depending on air-permeability.

As shown in the above Table 3 and accompanying FIG. 5, it could be found that when the air-permeability of the noise absorbing and insulating material is higher, the noise absorption performance is at 4 kHz or less, which is road noise concern section.

Test 5

Noise insulation performance of the noise absorbing and insulating material according to Example of the present inventive concept depending on difference of air-permeability was tested, and the results were shown in the following Table 4 and accompanying FIG. 6. At this time, it was tested against high air-permeability [7~12 ($cm^3/cm^2 \cdot sec$)] and low air-permeability [6~10 ($cm^3/cm^2 \cdot sec$)] of the noise absorbing and insulating material, separately.

TABLE 4

| Classifications | Frequency (Hz) | | | | | | | | | | | | | |
|---|---|---|---|---|---|---|---|---|---|---|---|---|---|---|
| | 400 | 500 | 630 | 800 | 1k | 1.25k | 1.6k | 2k | 2.5k | 3.15k | 4k | 5k | 6.3k | 8k |
| Transmission Loss (dB) (Air-permeability 6~10) | 10.50 | 13.70 | 11.80 | 20.40 | 20.00 | 16.70 | 21.40 | 18.80 | 21.30 | 23.10 | 21.50 | 23.80 | 25.70 | 21.70 |

TABLE 4-continued

| Classifications | Frequency (Hz) | | | | | | | | | | | | |
|---|---|---|---|---|---|---|---|---|---|---|---|---|---|
| | 400 | 500 | 630 | 800 | 1k | 1.25k | 1.6k | 2k | 2.5k | 3.15k | 4k | 5k | 6.3k | 8k |
| Noise absorbing and insulating material Transmission Loss (dB) (Air-permeability 7~12) | 11.40 | 13.50 | 11.80 | 20.00 | 19.90 | 16.70 | 21.60 | 18.70 | 21.30 | 23.60 | 22.20 | 25.40 | 26.20 | 21.70 |

Figure 6:
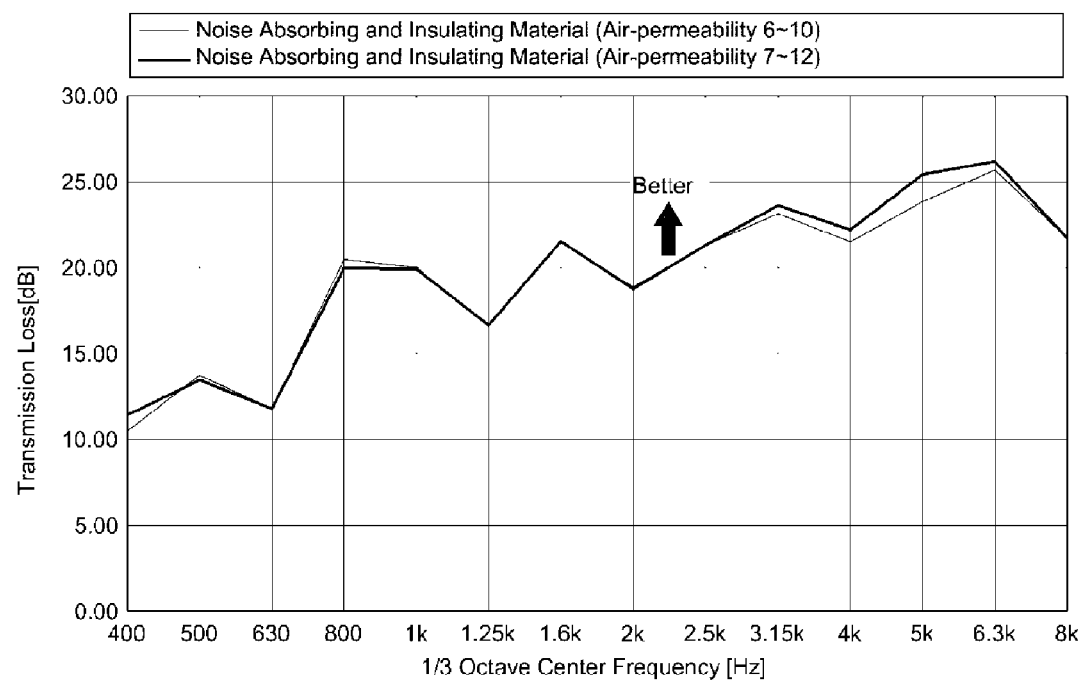
FIG. 6 is a graph showing the result of testing noise insulation of the multi-layered noise absorbing and insulating material according to the present inventive concept depending on air-permeability.

As shown in the above Table 4 and accompanying FIG. 6, it could be found that the noise insulation performances of the noise absorbing and insulating material were in the identical level regardless of air-permeability, i.e., regardless of high and low air-permeability.

As mentioned above, an embodiment of the multi-layered noise absorbing and insulating material of the present inventive concept provides air-permeability by including PET FELT as a noise absorption material and a noise insulation material having air-permeability. Accordingly, it can maximize noise absorption and insulation performance using noise absorption property of the first noise absorption material and the second noise absorption material, and more improve the noise absorption performance due to air-permeability structure of the noise insulation material.

In an embodiment, the multi-layered noise absorbing and insulating material of the present inventive concept can maximize noise absorption and insulation performance and embody weight reduction by applying fiber, felt or nonwoven fabric and the like as a noise absorption material.

In certain embodiments, by applying a noise insulation material having air-permeability as a noise insulation material, the noise insulation performance can be improved, thereby reducing interior noise, and also promote productivity increase as well as reduction of process numbers and production costs because there is no need for a separate additional adhering process of the noise insulation material.

The inventive concept has been described in detail with reference to embodiments thereof. However, it will be appreciated by those skilled in the art that changes may be made in these embodiments without departing from the principles and spirit of the inventive concept, the scope of which is defined in the appended claims and their equivalents.

What is claimed is:

1. A multi-layered noise absorbing and insulating material comprising:
   a noise insulation material having opposing first and second major surfaces, the noise insulation material comprising an adhesive resin including an air permeability-forming material,
   a first noise absorption material adhered to the first major surface of the noise insulation material; and
   a second noise absorption material adhered to the second major surface of the noise insulation material,
   wherein the multi-layered noise absorbing and insulating material has air-permeability, and
   wherein each of the first noise absorption material and the second noise absorption material is thicker than the noise insulation material.

2. The multi-layered noise absorbing and insulating material of claim 1, wherein the multi-layered noise absorbing and insulating material is integrated.

3. The multi-layered noise absorbing and insulating material of claim 1, wherein the air permeability-forming material is at least one selected from the group consisting of thermoplastic elastomer (TPE), inorganic powder, natural fiber and natural wood flour.

4. The multi-layered noise absorbing and insulating material of claim 3, wherein the air permeability-forming material is the thermoplastic elastomer, and the thermoplastic elastomer is at least one selected from the group consisting of polystyrene-based, polyolefin-based, polyester-based, polyurethane-based and polyamide-based elastomer.

5. The multi-layered noise absorbing and insulating material of claim 3, wherein the air permeability-forming material is the inorganic powder, and the inorganic powder is at least one selected from the group consisting of calcium carbonate, barium sulfate, silicon dioxide, aluminum oxide, magnesium hydroxide and vermiculite.

6. The multi-layered noise absorbing and insulating material of claim 3, wherein the air permeability-forming material is the natural fiber, and the natural fiber is at least one of Chinese yam and jute.

7. The multi-layered noise absorbing and insulating material of claim 3, wherein the air permeability-forming material is the natural wood flour, and then natural wood flour is at least one selected from the group consisting of pine tree, bamboo and oak tree.

8. The multi-layered noise absorbing and insulating material of claim 1, wherein the air permeability-forming material is contained in an amount of 40 to 70 wt %, based on a total weight of the adhesive resin.

9. The multi-layered noise absorbing and insulating material of claim 1, wherein the adhesive resin is at least one of thermoplastic resin and thermosetting resin.

10. The multi-layered noise absorbing and insulating material of claim 9, wherein the adhesive resin is the thermoplastic resin, and the thermoplastic resin is at least one selected from the group consisting of polyethylene, polypropylene, polyethyleneterephthalate, polybutyleneterephthalate, polytrimethyleneterephthalate, nylon, polyacetal resin, vinyl chloride resin, polystyrene, acrylonitrile-butadiene-styrene resin and acryl resin.

11. The multi-layered noise absorbing and insulating material of claim 9, wherein the adhesive resin is the thermosetting resin, and the thermosetting resin is at least one resin selected from the group consisting of phenol resin, urea resin, melamine resin, epoxy resin and polyester resin.

12. The multi-layered noise absorbing and insulating material of claim 1, wherein the noise absorption material is any one selected from the group consisting of needle-punched material, silk wadding PET felt in which low melting fiber and polyester fiber (pet fiber) are thermally bonded, other felt and non-woven fabric.

13. The multi-layered noise absorbing and insulating material of claim 1, wherein the thickness of the noise insulation material is 0.01 to 10 mm.

14. The multi-layered noise absorbing and insulating material of claim 1, which has an entire thickness of 1 to 100 mm, air-permeability in the thickness direction of 0.01 to 300 ($cm^3/cm^2 \cdot sec$), and weight of 10 to 3000 $g/cm^2$.

15. A part adapted to be installed in a vehicle and containing a multi-layered noise absorbing and insulating material comprising a noise insulation material having opposing first and second major surfaces, the noise insulation material comprising an adhesive resin including an air permeability-forming material, a first noise absorption material adhered to the first major surface of the noise insulation material, and a second noise absorption material adhered to the second major surface of the noise insulation material,
- wherein the multi-layered noise absorbing and insulating material has air-permeability, and
- wherein each of the first noise absorption material and the second noise absorption material is thicker than the noise insulation material.

16. The part of claim 15, wherein the part is a wheel guard.

17. The part of claim 16, wherein the wheel guard is installed between a tire of the vehicle and a body of the vehicle, and the multi-layered noise absorbing and insulating material is configured to reduce noise during driving of the vehicle.

\* \* \* \* \*